Figure 5:
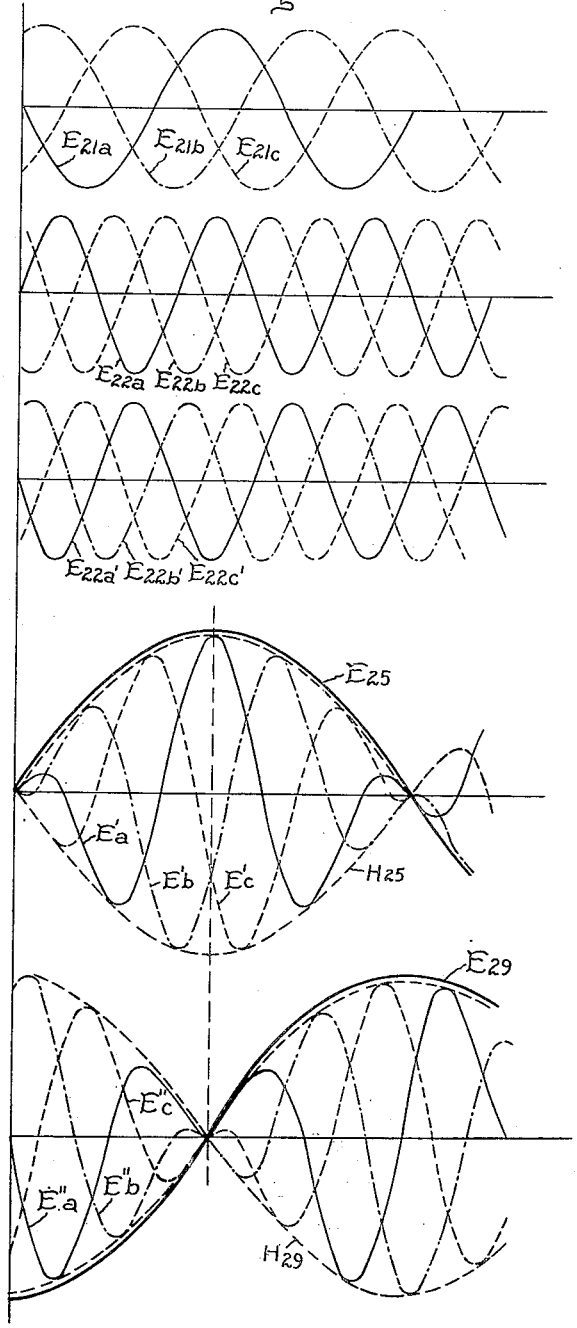

Oct. 31, 1939.   W. PETERSEN   2,178,433
METHOD OF AND APPARATUS FOR GENERATING ALTERNATING CURRENT
Filed Aug. 12, 1938   4 Sheets-Sheet 1
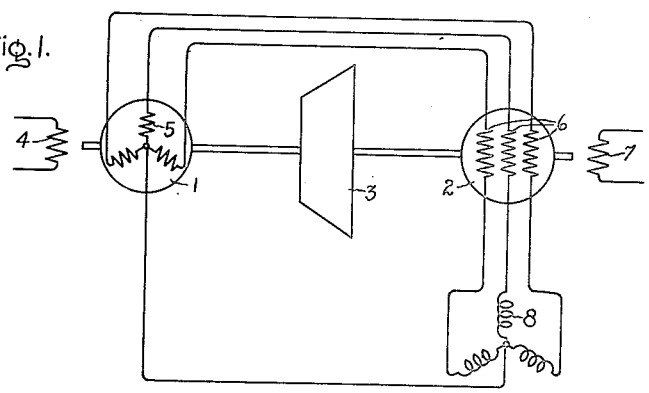
Fig. 1.
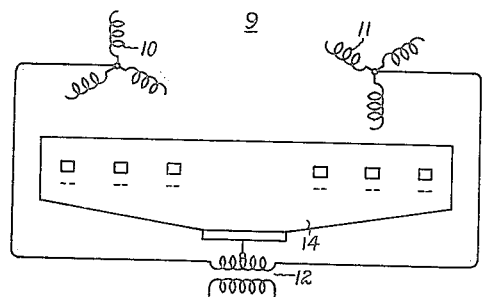
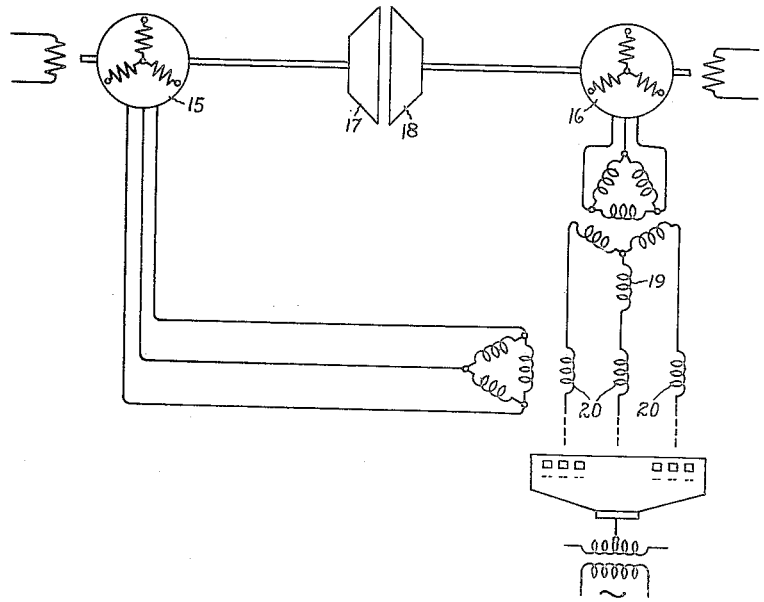
Fig. 3.
Inventor:
Waldemar Petersen,
by Harry E. Dunham
His Attorney.

Oct. 31, 1939.  W. PETERSEN  2,178,433
METHOD OF AND APPARATUS FOR GENERATING ALTERNATING CURRENT
Filed Aug. 12, 1938  4 Sheets-Sheet 2
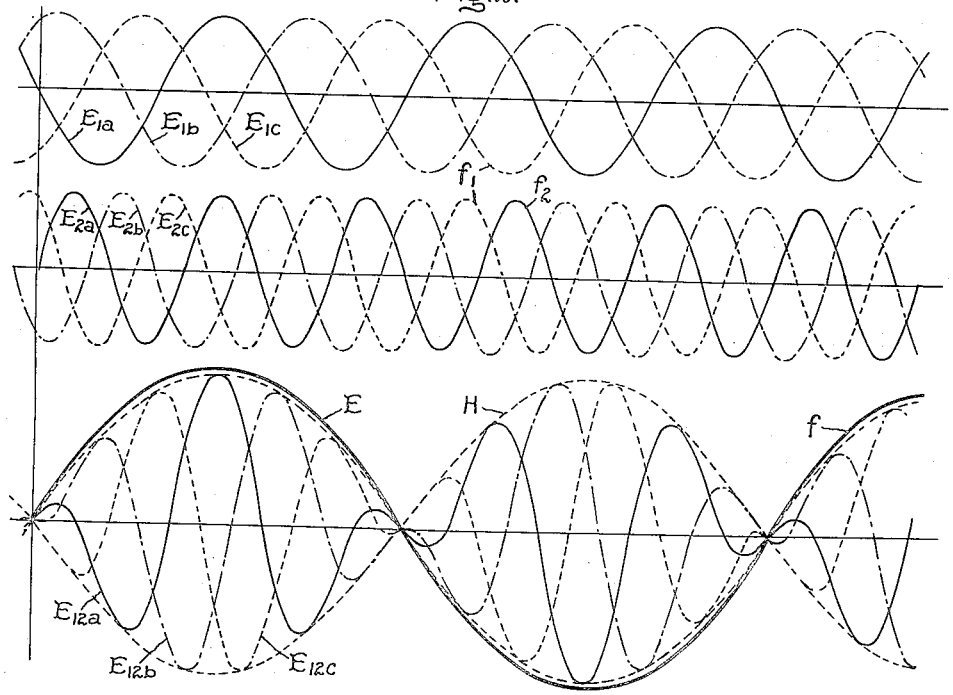
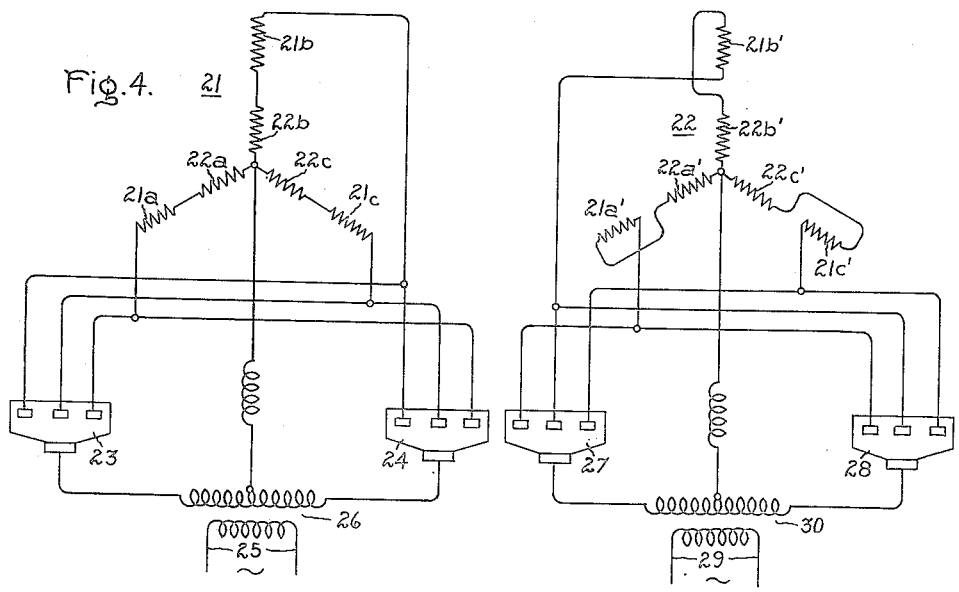
Inventor:
Waldemar Petersen,
by Harry E. Dunham
His Attorney.

Inventor:
Waldemar Petersen,
by Harry E. Dunham
His Attorney.

Patented Oct. 31, 1939

2,178,433

UNITED STATES PATENT OFFICE

2,178,433

METHOD OF AND APPARATUS FOR GENERATING ALTERNATING CURRENT

Waldemar Petersen, Berlin, Germany, assignor to General Electric Company, a corporation of New York Application August 12, 1938, Serial No. 224,440½
In Germany June 22, 1937

8 Claims. (Cl. 172—281)

My invention relates to the method of and apparatus for generating alternating current and more particularly to such apparatus wherein the prime mover comprises a turbine or turbines.

It has been recognized that it would be desirable to utilize turbines for generating polyphase alternating current by directly coupling a generator to the turbine. At the present time this can only be accomplished at slow speed by using generators having a small number of poles. It furthermore has been suggested that a turbine could be used to generate a high frequency and to rectify and convert this higher frequency by means of electric valve frequency converting apparatus to a lower frequency. But this has the disadvantage of introducing a pulsation into the field of the generator which has a frequency corresponding to the frequency of the output circuit. Furthermore it is necessary to make the exciter structure of laminated iron. In my concurrently filed application Serial No. 224,439½ for Method of and apparatus for producing a variable frequency alternating current, which is assigned to the same assignee as the present application, I have disclosed and claimed an arrangement wherein an electric valve frequency converting apparatus is energized from two relatively high frequency alternating currents and a low frequency alternating current output is obtained which has a frequency equal to half of the difference of the frequency of the high frequency supply circuit. As has been explained in detail in my above-mentioned copending application when two alternating currents of different frequencies are superimposed a resultant alternating current is obtained having a variable amplitude and a frequency equal to the mean of the frequencies of the alternating currents superimposed. The amplitude of the resultant alternating current varies periodically according to a definite cycle, one complete rise and fall of amplitude defining a beat cycle. Two resultant beat frequencies are obtained by such superimposition, as is well known by those skilled in the art, one of which is equal to the sum of the two frequencies superimposed and the other having a frequency equal to the difference between the original frequencies superimposed. By producing an alternating current the half cycles of which are made up of alternate positive and negative envelopes defining successive beat cycles, a frequency is obtained which is equal to half the difference between the frequencies of the two alternating currents which are superimposed. Apparatus for producing this result has been described and claimed in my above mentioned copending application. In accordance with the present invention certain of the principles therein disclosed may be applied to the problem of generating alternating current by means of turbines to which there is directly connected a generator or generators. These generators, as is customary, may be excited by direct current. Two relatively high frequencies are generated which have a frequency difference equal to twice the frequency of the load circuit and these alternating currents are added vectorially and converted by an electric valve frequency converting system to alternating current of the desired load frequency.

It is an object of my invention to provide an improved alternating current generating system wherein the prime movers comprise a turbine or turbines and which will overcome certain limitations of the arrangements of the prior art, and which will be simple and reliable in operation.

Figure 6:
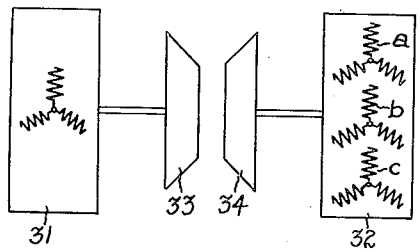
Figure 7:
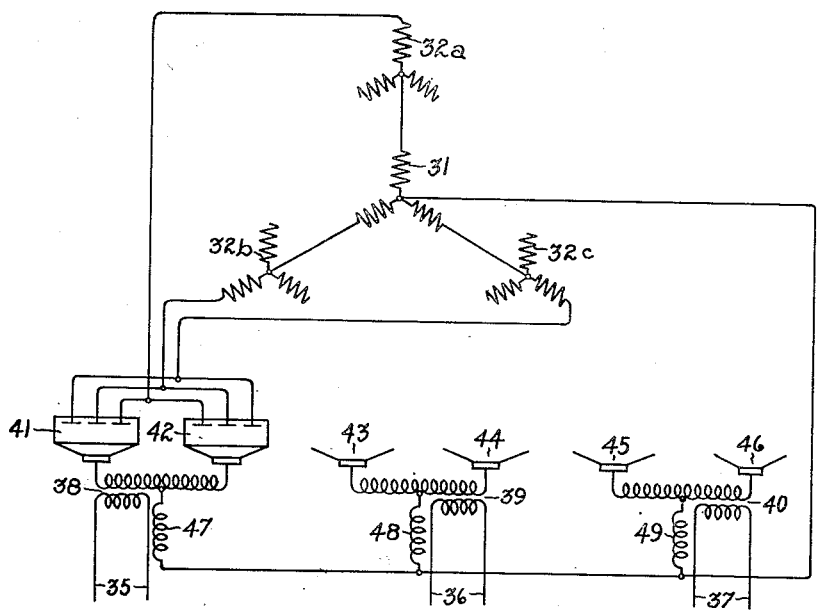

The novel features which I believe to be characteristic of my invention are set forth with particularity in the appended claims. My invention itself, however, both as to its organization and method of operation together with further objects and advantages thereof, will be better understood by reference to the following description taken in connection with the accompanying drawings in which Fig. 1 illustrates an arrangement utilizing a single turbine to which my invention has been applied; Fig. 2 shows curves which illustrate the operation of my invention; Fig. 3 shows the application of my invention to an arrangement utilizing two turbines; Fig. 4 shows how my invention may be applied to an arrangement for producing two-phase alternating current; Fig. 5 shows curves illustrating the operation of the arrangement shown in Fig. 4; Figs. 6 and 7 show other arrangements embodying my invention for the production of polyphase alternating current.

Referring to Fig. 1 of the drawings I have shown therein the application of my invention to an arrangement in which two polyphase alternating current generators 1 and 2 are directly connected to a steam turbine 3. Generator 1 is provided with a field winding 4 which is energized from any suitable source of direct current, and has a polyphase winding 5 arranged in star relation. The generator 2 has a polyphase group of windings 6 and a direct current field winding 7. The polyphase winding 5 of the generator 1 is connected in series with polyphase windings 6 of the generator 2 which in turn are connected in series with the primary windings 8 of a transformer 9, the primary neutral point of which is connected to the neutral point of the polyphase winding 5 of the generator 1. The transformer 9 is provided with a plurality of secondary networks 10 and 11 the neutral points of which are each connected to one of the terminals of the primary winding of a transformer 12 the secondary winding of which is connected to an alternating current load circuit 13. The midpoint of the primary winding of the transformer 12 is connected to the common cathode connection of a plurality of groups of electric discharge valves which may comprise an electric valve 14 of the multi-anode single cathode type. Each of the anodes thereof are connected to one of the outer extremities of the polyphase secondary networks 10 and 11. While for the purposes of illustration in the group of valves 14 has been shown as being of the multi-anode single cathode type, it of course will be apparent that any other type commonly utilized in the art may be employed although it is preferable to utilize valves having an anode and a cathode enclosed within an envelope containing an ionizable medium. If desired, control electrodes and suitable control circuits may be provided in accordance with any of the arrangements common in the art. For example, the well known circuit described and illustrated in U. S. Patent No. 1,408,118, granted February 28, 1922, to F. W. Meyer, may be applied to the arrangement shown in Fig. 1. All that the control circuit must accomplish is that during one half cycle of the alternating current flowing in load circuit 13 the control electrodes for the discharge paths associated with the secondary network 10 are energized with a positive potential so that these discharge paths may become conductive a plurality of times in accordance with the voltages $E_{12a}$, $E_{12b}$ and $E_{12c}$, illustrated in Fig. 2, which are impressed upon the anodes of the respective discharge paths. During the next half cycle the control electrodes for the discharge paths associated with secondary winding 10 must be maintained nonconductive by suitable means well known in the art, while the discharge paths associated with secondary network 11 must be able to conduct current successively in accordance with the resultant high frequency potentials impressed on the anodes of these associated discharge paths. This arrangement is clearly disclosed in the above-mentioned patent to Meyer. In accordance with my invention the two generators 1 and 2 must produce frequencies which differ from each other by an amount equal to twice the frequency of the alternating current circuit 11. The frequency obtained by the electric valve converting apparatus is represented by the symbol $f$ and is equal to $$\frac{f_2-f_1}{2}$$

where $f_1$ and $f_2$ are the frequencies of the generators 1 and 2. From this formula it is apparent that the value of the frequency $f$ may be any desired value including those frequencies commonly utilized in commercial practice of the order of 25 to 60 cycles. When commercial frequencies are to be produced it is preferable to select relatively high values for $f_1$ and $f_2$ in order to obtain a smooth output current and furthermore to permit the prime mover to drive the generator at substantially the same speed as that of the prime mover. If it is desired to produce still lower frequencies or frequencies not commonly employed it will be apparent that this arrangement offers many advantages over arrangements for generating such frequencies directly since in some instances the design problems encountered in such machines make them economically impractical.

The operation of the arrangement in Fig. 1 will be apparent by reference to Fig. 2 wherein the first curve shows the voltages $E_{1a}$, $E_{1b}$, and $E_{1c}$, which are the voltages respectively of the three phases generated by the generator 1. The second curve shows $E_{2a}$, $E_{2b}$ and $E_{2c}$, which are the three phase voltages produced by the generator 2. These voltages are added together to form the voltages $E_{12a}$, $E_{12b}$, and $E_{12c}$, which are shown in the third curve of Fig. 2. These latter resultant curves have a common envelope H and by means of the electric valve frequency converting apparatus there is produced in the output circuit 13 the voltage E which has a frequency $f$.

The speed of the prime movers need not be maintained at a certain speed since it is only necessary that the difference between the two generated frequencies be equal to twice that of the output circuit and hence it is apparent that this may be applied to an arrangement utilizing two turbines or a turbine of the Ljungström type wherein one portion of the turbine drives one generator and the other portion drives another generator. Such an arrangement is shown in Fig. 3 wherein two polyphase generators 15 and 16 are driven by two turbines 17 and 18 or the two parts of a Ljungström turbine. The voltages produced by the generators 15 and 16 are added together by means of a series connected group of polyphase inductive networks 19 and 20 of the electric valve frequency converter. For the purposes of simplicity this converter has been indicated symbolically since it is apparent that any of the frequency converters in the art are adaptable to this application. In this arrangement it will become quite apparent that it is relatively simple to maintain a predetermined frequency difference between the alternating current generated in the generators 15 and 16, and that the speeds of the turbines 17 and 18 need not be maintained at any predetermined value since it is only necessary to maintain a predetermined frequency difference between the generator output. Thus the regulating devices necessary for the turbines become relatively simple and accurate since a cycle deviation between the relative frequencies of the generators produces only the half cycle difference in the output circuit of the electric valve frequency converting apparatus.

While the arrangements shown in Figs. 1 and 3 have indicated a single phase output from the electric valve frequency converting apparatus, it of course is well known in the art that such type of apparatus may be also utilized to produce polyphase alternating current.

Another manner of obtaining polyphase electric voltages is shown in Fig. 4 wherein two generators 21 and 22 are of the double winding type each having two sets of windings $a$, $b$, $c$, and $a'$, $b'$ and $c'$. For the purposes of simplicity the prime movers for these generators have not been shown. Furthermore, in order to avoid complication in the winding diagram the several phase windings of the respective generators 21 and 22 are not shown in the usual diagrammatic form as representing a single machine for each group of phase windings. One set of windings of the one machine is connected in series with a corresponding set on the other machine so that for example, as shown in the left-hand portion of Fig. 4 these windings are connected in series so as to form the inductive network of the electric valve frequency converting apparatus which includes two groups of electric valves 23 and 24 which supply energy to the output circuit 25 by means of the transformer 26. The other set of windings of the generator are connected so that the phase of the alternating current added by one set is reversed. Thus as shown in the right-hand portion of Fig. 4 the windings 21a' and 22a' for example, are reversely connected. These windings form the inductive networks of a second electric valve frequency converting apparatus including two groups of electric valves 27 and 28 which supply energy to the alternating current output circuit 29 by means of a transformer 30. Thus the alternating current circuits 25 and 29 supply two phase voltages having a phase relation of 90 degrees.

The operation of the arrangement in Fig. 4 will readily become apparent by reference to Fig. 5 wherein the first curve shown at $E_{21a}$, $E_{21b}$, and $E_{21c}$, which correspond to the voltages generated by the generator 21 in each of the groups of windings, $a$, $b$, $c$, and $a'$, $b'$, $c'$. The second set of curves shows the values $E_{22a}$, $E_{22b}$, and $E_{22c}$, which represent the voltages generated in the one set of windings of the generator 22 shown in the left-hand portion of Fig. 4. The third set of curves showing the values $E_{22a'}$, $E_{22b'}$, and $E_{22c'}$, which represent the voltages generated by the other groups of windings of the generator 22 and which are shown in the right-hand portion of Fig. 4. The addition of the voltages of the two groups of serially connected windings of the generators 21 and 22 as indicated in the left-hand portion of Fig. 4 are shown in the fourth curve wherein the values $E'_a$, $E'_b$ and $E'_c$ represent the resultant voltages which have an envelope $H_{25}$ and the voltage appearing across the output circuit 25 is shown by the curve $E_{25}$. The last set of curves in Fig. 5 shows the values of $E''_a$, $E''_b$, and $E''_c$ which represent the resultant voltages produced by the serially connected windings in the right-hand portion of Fig. 4 and which have an envelope $H_{29}$, and the curve $E_{29}$ represents the voltage appearing across the output circuit 29.

The arrangements shown in Figs. 6 and 7 illustrate another manner in which the principles of my invention may be utilized to produce polyphase alternating current. One single winding generator 31 and one triple winding generator 32 may be used and these may be driven by the turbines 33 and 34 respectively. The winding 31 may be connected in series with the windings of the generator 32 by connecting each of the terminals of the windings of the generator 31 to one of the neutrals of each of the windings $a$, $b$ and $c$ of the generator 32.

These windings then constitute the inductive network of an electric valve frequency converting arrangement having three-phase output circuits 35, 36, and 37. Each of these alternating current circuits is energized by means of a transformer such as transformers 38, 39 and 40, respectively. Each of the primary windings of the transformers is energized by two groups of valves 41, 42, 43, 44 and 45, 46, respectively. For the purposes of simplicity only two groups of valves 41 and 42 are shown connected to the outer extremities of one of each of the groups of windings 32a, 32b and 32c. The midpoints of each of these transformers 38, 39 and 40 are connected respectively through suitable inductors 47, 48 and 49 to the midpoint of the inductive winding network 31.

Although numerous electric valve frequency converting arrangements have been indicated as comprising a part of the arrangements shown, they have not been shown in detail nor have any grid control circuits been indicated since my invention is not limited to use with any particular type of electric valve frequency converting arrangements, but any other type commonly used in the art will be satisfactory.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:

1. The method of generating alternating current by means of a plurality of relatively high frequency generators which comprises maintaining a predetermined frequency difference between the currents generated by said generators, vectorially combining the outputs of said generators, and converting said vectorially combined outputs to produce an alternating current having a frequency equal to half of said predetermined frequency difference.

2. The combination comprising a generator having a given frequency, a second generator of a different frequency, prime mover means connected to operate said generators at relatively the same speeds as the prime mover means associated therewith, means for vectorially combining the energy output of said generators to produce a resultant energy component, and an electric valve frequency converting system energized from said resultant energy component for supplying energy to a load circuit at a frequency low relative to the frequency of said generators.

3. The combination comprising a generator of an alternating current frequency which is high relative to commercial frequencies of the order of 60 cycles, a second generator of the same relative order of frequency as said first generator and differing therefrom, prime mover means connected to operate said generators at relatively the same speeds as the prime mover means associated therewith, means for vectorially combining the alternating current output of said generator to produce a resultant alternating current, and an electric valve frequency converting system energized by said resultant alternating current for supplying energy to a load circuit at a frequency which is low relative to the frequency of said generators.

4. The combination comprising two generators for producing two alternating currents of different frequencies, means for connecting in series the output of said generators, prime mover means directly connected with said generators, and an electric valve converting system energized from said series connected generators for supplying energy to a load circuit.

5. The combination comprising two generators for producing two alternating currents of different frequencies each being high relative to commercial frequencies of the order of 60 cycles, means for connecting in series the outputs of said generators, prime mover means connected to operate said generators at relatively the same speed as the prime mover means associated therewith, and an electric valve converting system energized from said series connected generators for producing alternating current of commercial frequency.

6. The combination comprising a pair of relatively high frequency alternating current generators, turbine means directly connected to said generators, said turbine means and said generators cooperating to produce two alternating currents having a predetermined frequency difference, means for vectorially combining the alternating current output of said generators, and electric valve converting means energized by said combined output for producing an alternating current of a frequency equal to half the frequency difference of said generators.

7. The combination comprising a pair of relatively high frequency alternating current generators, one of said generators being provided with a plurality of alternating current windings, turbine means directly connected to said generators, said turbine means and said generators cooperating to produce two sets of alternating currents having a predetermined frequency difference, means for vectorially combining said alternating currents of different frequency to produce resultant alternating currents of variable frequency and variable amplitude, and electric valve converting apparatus energized by said resultant alternating current for supplying energy to a load circuit at a frequency equal to half of said predetermined frequency difference.

8. The combination comprising a pair of relatively high frequency polyphase alternating current generators, one of said generators being provided with a plurality of polyphase windings, turbine means directly connected to said generators, said turbine means and said generators cooperating to produce two sets of alternating current having a predetermined frequency difference, means for vectorially combining each of said polyphase alternating currents of one frequency with a polyphase alternating current of a different frequency to produce resultant polyphase alternating currents of variable frequency and variable amplitude, and electric valve converting apparatus energized by said resultant polyphase alternating currents for supplying a polyphase alternating current to a load circuit at a frequency equal to half of said predetermined frequency difference.

WALDEMAR PETERSEN.